(12) United States Patent
Chung

(10) Patent No.: US 9,709,868 B2
(45) Date of Patent: Jul. 18, 2017

(54) ELECTROCHROMIC DEVICE

(71) Applicant: Tintable Kibing Co., Ltd., Tainan (TW)

(72) Inventor: Yi-Wen Chung, Tainan (TW)

(73) Assignee: Tintable Kibing Co., Ltd., Tainan (TW)

( * ) Notice: Subject to any disclaimer, the term of this patent is extended or adjusted under 35 U.S.C. 154(b) by 0 days.

(21) Appl. No.: 15/096,723

(22) Filed: Apr. 12, 2016

(65) Prior Publication Data

US 2016/0334687 A1    Nov. 17, 2016

(30) Foreign Application Priority Data

May 15, 2015   (TW) .............................. 104115578 A

(51) Int. Cl.
*G02F 1/155*   (2006.01)
*G02F 1/157*   (2006.01)
*G02F 1/161*   (2006.01)

(52) U.S. Cl.
CPC .............. *G02F 1/155* (2013.01); *G02F 1/157* (2013.01); *G02F 1/161* (2013.01)

(58) Field of Classification Search
CPC ........ G06F 1/182; G06F 1/187; G11B 33/122
USPC ................................... 359/365–375; 345/105
See application file for complete search history.

(56) References Cited

U.S. PATENT DOCUMENTS 6,710,907 B2 *   3/2004   Mochizuka ............. G02F 1/153
                                                   348/E5.131
2010/0165440 A1   7/2010   Nguyen et al.

FOREIGN PATENT DOCUMENTS

CN          102460291 A      5/2012

* cited by examiner

*Primary Examiner* — Tuyen Tra
(74) *Attorney, Agent, or Firm* — Husch Blackwell LLP

(57) ABSTRACT

An electrochromic device includes a housing, an electrochromic structure, and a cover. The housing defines a receiving space therein and has an opening. The electrochromic structure is disposed in the receiving space, and has a central region and a peripheral region. The electrochromic structure includes an upper substrate, a lower substrate, an upper electrode, a lower electrode, and an electrochromic laminate sandwiched between the upper the lower electrodes. The cover includes a protecting plate covering the opening, and a shielding member disposed between the peripheral region of the electrochromic structure and the protecting plate and covering the peripheral region.

12 Claims, 4 Drawing Sheets

ELECTROCHROMIC DEVICE

CROSS-REFERENCE TO RELATED APPLICATION

This application claims priority of Taiwanese Application No. 104115578, filed on May 15, 2015.

FIELD

The disclosure relates to an electrochromic device, more particularly to an electrochromic device with a shielding member.

BACKGROUND

An electrochromic device is capable of varying its light transmission in response to the application of an electric field, and can be used for applications such as windows, rear-view mirrors, etc. When the electrochromic device is used as a rear-view mirror, it can control the flow of light reflected toward the driver so as to prevent the driver from being blinded by bright lights from a following car.

Referring to FIGS. 1 and 2, a conventional electrochromic device that can be used as a rear-view mirror mainly includes a first frame 91 that defines a space 910, an electrochromic structure 93 that is disposed in the space 910, and a second frame 92 that is disposed on the first frame 91. The electrochromic structure 93 includes an upper glass substrate 931, a lower glass substrate 933, an upper transparent electrode layer (not shown) that is formed on the upper glass substrate 931, a lower transparent electrode layer (not shown) that is formed on the lower glass substrate 933, an upper contact 932 that is formed on the upper transparent electrode layer, a lower contact 934 that is formed on the lower transparent electrode layer, and an electrochromic laminate (not shown) that is disposed between the upper and lower transparent electrode layers.

In order to apply the external electric field between the upper and lower contacts 932, 934, the upper and lower substrates 931, 933 of the conventional electrochromic device are positioned offset from each other so as to expose the upper and lower contacts 932, 934 that are respectively formed thereon.

The exposed portions of the upper and lower substrates 931, 933 may be protected by two protecting members 94. Each of the protecting members 94 includes a plurality of spring clips 941 that are made from metal and that are capable of transmitting the external electrical power to the contacts 932, 934. The second frame 92 is fabricated to have an opaque portion and a light-transmissive portion using two different materials. The opaque portion is aligned with the protecting members 94 to conceal the protecting members 94 which adversely affect the appearance of the electrochromic device. However, fabrication of the second frame 92 with the opaque portion and the light-transmissive portion is rather complicated as it requires the use of different materials.

SUMMARY

Therefore, an object of the disclosure is to provide an electrochromic device that can alleviate the drawback of the prior art.

According to the disclosure, the electrochromic device includes a housing, an electrochromic structure, and a cover. The housing defines a receiving space therein and has an opening.

The electrochromic structure is disposed in the receiving space, and has a central region and a peripheral region that extends outwardly from the central region. The electrochromic structure includes a light-transmissive upper substrate, a lower substrate, a light-transmissive upper electrode which is formed on the upper substrate, a lower electrode which is formed on the lower substrate, and an electrochromic laminate which is sandwiched between the upper electrode and the lower electrode.

The cover includes a light-transmissive protecting plate that has a surrounding portion and that covers the opening of the housing so as to completely cover the electrochromic structure 2, and a shielding member that is disposed between the peripheral region of the electrochromic structure and the protecting plate and that covers the peripheral region of the electrochromic structure, the shielding member being directly formed on the surrounding portion of the protecting plate 61.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
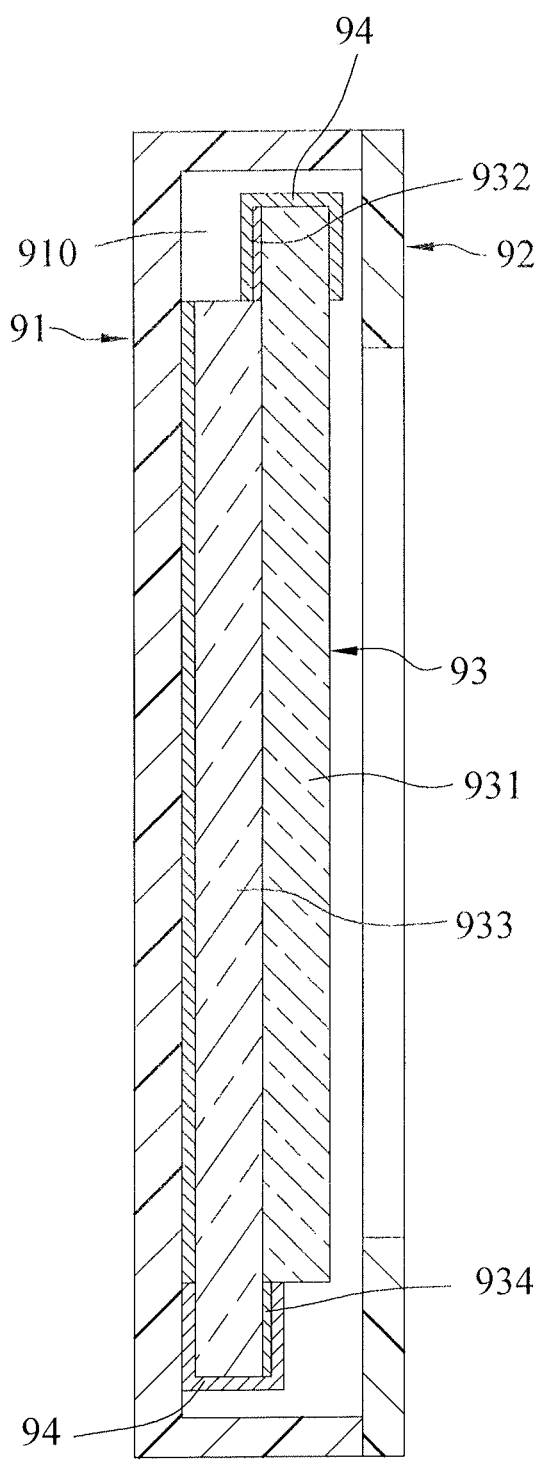
FIG. 1 is a cross-sectional view illustrating a conventional electrochromic device.
Figure 2:
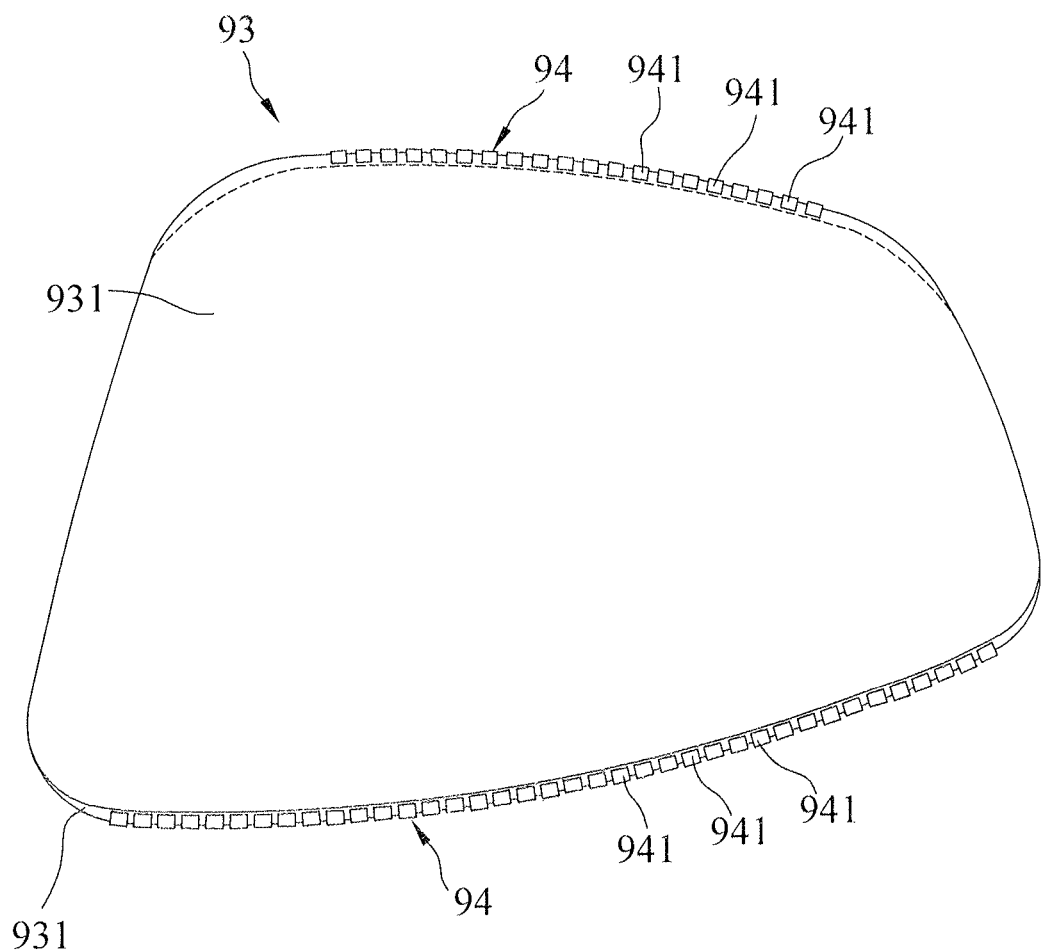
FIG. 2 is a perspective view illustrating the conventional electrochromic device served as a rear-view mirror.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
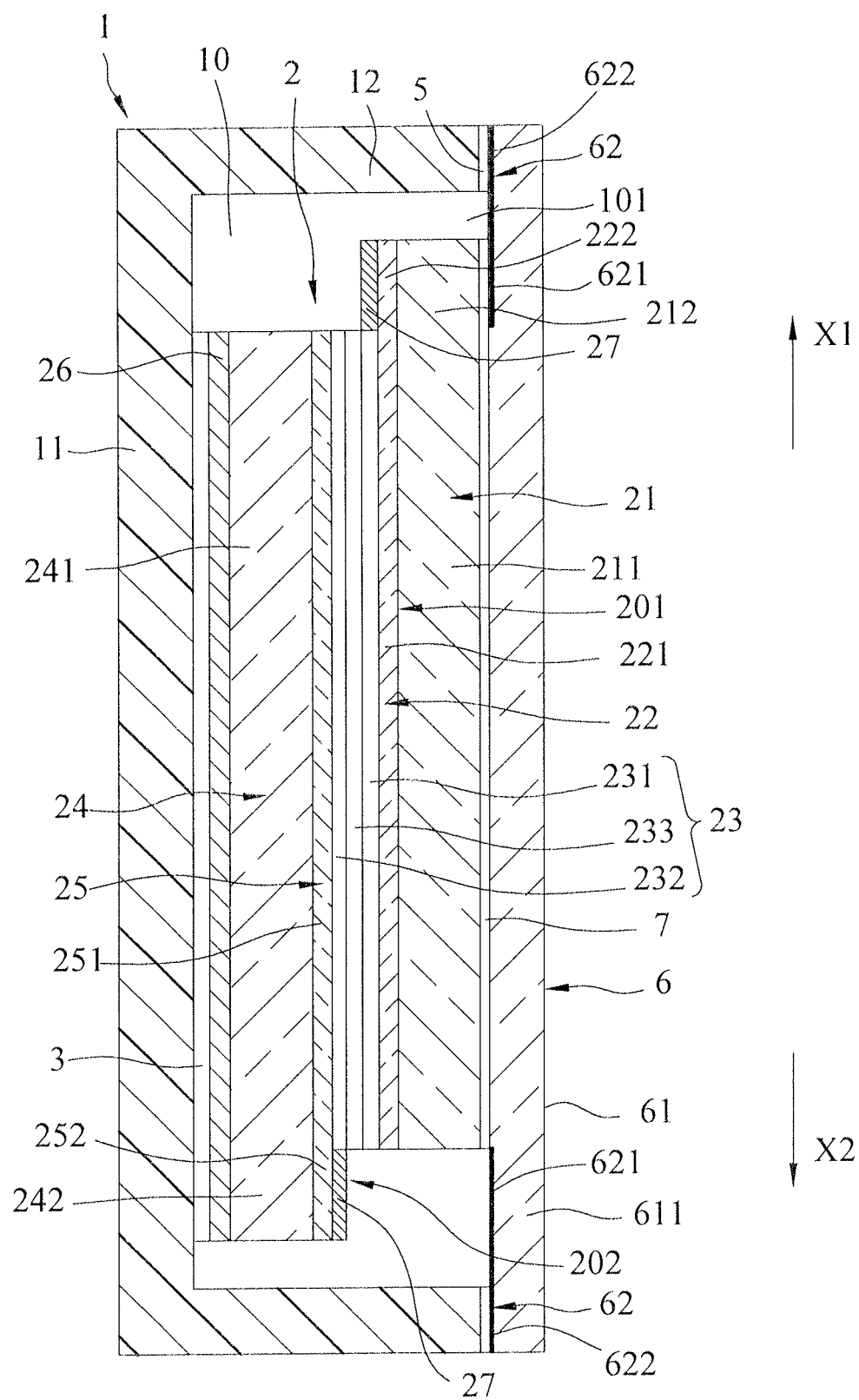
FIG. 3 is a cross-sectional view illustrating a first embodiment of an electrochromic device according to the disclosure.

Referring to FIG. 3, the first embodiment of an electrochromic device according to the disclosure includes a housing 1, an electrochromic structure 2, a cover 6, an optical adhesive 7, a first adhesive 3, and a second adhesive 5.

The housing 1 defines a receiving space 10 therein and has an opening 101 in spatial communication with the receiving space 10. In the embodiment, the housing 1 includes a bottom plate 11, and a surrounding wall 12 that extends from a periphery of the bottom plate 11 and cooperates with the bottom plate 11 to define the receiving place 10. The housing 1 may be made of plastics.

The electrochromic structure 2 is disposed in the receiving space 10. The electrochromic structure 2 has a central region 201 and a peripheral region 202 that extends outwardly from the central region 201. The electrochromic structure 2 includes a light-transmissive upper substrate 21, a lower substrate 24, a light-transmissive upper electrode 22 that is formed on the upper substrate 21 and disposed between the upper substrate 21 and the lower substrate 24, a lower electrode 25 that is formed on the lower substrate 24 and disposed between the upper substrate 21 and the lower substrate 24, an electrochromic laminate 23, a reflecting layer 26, and two contacts 27. The electrochromic laminate 23 includes an active layer 231 that is made of an electrochromic material and that is disposed beneath the upper electrode 22, an ion storage layer 232 that is disposed on the lower electrode 25, and an electrolyte layer 233 that is sandwiched between the active layer 231 and the ion storage layer 232.

In this embodiment, the upper substrate 21 and the lower substrate 24 are made of a light-transmissive material, such as plastics or glass. The lower substrate 24 is relatively close to the bottom plate 11, and the upper substrate 21 is relatively far from the bottom plate 11. The upper substrate 21 includes an upper main region 211 and an upper side region 212 that extends from the upper main region 211 in a first direction (X1). The lower substrate 24 includes a lower main region 241 and a lower side region 242 that extends from the lower main region 241 in a second direction (X2) which is opposite to the first direction (X1).

In this embodiment, the upper electrode 22 and the lower electrode 25 may be made from a light-transmissive and conductive material, such as ITO or IZO. The upper electrode 22 includes an upper main part 221 that is formed on the upper main region 211, and an upper side part 222 that extends from the upper main part 221 and that is formed on the upper side region 212. The lower electrode 25 includes a lower main part 251 that is formed on the lower main region 241, and a lower side part 252 that extends from the lower main part 251 and that is formed on the lower side region 242. The upper and lower side regions 212, 242 and the upper and lower side parts 222, 252 cooperatively define the peripheral region 202 of the electrochromic structure 2.

The electrolyte layer 233 is made of an electrolyte material, such as a lithium perchlorate-based electrolyte solution or a solid electrolyte. The material undergoes reversible changes in optical properties by an electrochemical redox reaction upon application of an electrical field.

The active layer 231 is a made of an electrochromic material. The electrochromic material undergoes reversible changes in optical properties by an electrochemical redox reaction upon application of an electrical field. The electrochromic material may be an organic material or an inorganic material. The inorganic material may be metal oxide, such as tungsten trioxide ($WO_3$) or vanadium oxide ($V_2O_5$). The organic material may be viologens.

The ion storage layer 232 stores ions generated during the electrochemical redox reaction, so as to maintain the charge balance in the electrochromic structure 2. The ion storage layer 232 may be made of nickel oxide (NiO). In certain embodiments, the ion storage layer 232 may be made of an electrochromic material, and light emitted from the ion storage layer 232 and light emitted from the active layer 231 may mix with each other. In this embodiment, the electrochromic laminate 23, the upper and lower main regions 211, 241, and the upper and lower main parts 221, 251 cooperatively define the central region 201 of the electrochromic structure 2.

The reflecting layer 26 is disposed between the bottom plate 11 of the housing 1 and the lower substrate 24. The reflecting layer 26 may be a mercury-coated layer, an aluminum (Al) layer, or a chromium (Cr) layer. Light can be reflected by the reflecting layer 26, so that the electrochromic structure 2 can serve as a mirror. In this embodiment, the electrochromic structure 2 is used as a rear-view mirror. The reflecting layer 26 may be a layer capable of reflecting and transmitting light, and a display unit may be assembled with the reflecting layer 26.

The contacts 27 are respectively disposed on the upper side part 222 of the upper electrode 22 and the lower side part 252 of the lower electrode 25. The contacts 27 may connect to a conducting wire (not shown), such that an external electrical voltage may be transmitted into the electrochromic structure 2 through the contacts 27 and the upper and lower electrodes 22, 25.

The first adhesive 3 is sandwiched between the housing 1 and the reflecting layer 26 so as to connect the electrochromic structure 2 to the housing 1.

The cover 6 includes a light-transmissive protecting plate 61 and a shielding member 62. The surrounding wall 12 of the housing 1 extends from the periphery of the bottom plate 11 toward the cover 6. The protecting plate 61 has a central portion and a surrounding portion 611 surrounding the central portion, and covers the opening 101 of the housing 1 so as to completely cover and seal the electrochromic structure 2 in the receiving space 10. The shielding member 62 is disposed between the peripheral region 202 of the electrochromic structure 2 and the protecting plate 61, and covers the peripheral region 202 of the electrochromic structure 2. In this embodiment, the cover 6 covers the surrounding wall 12 to seal the opening 101.

The shielding member 62 is directly formed on the surrounding portion 611 of the protecting plate 61 using a plating technique, a screen printing technique, a coating technique, etc. In this embodiment, the shielding member 62 has a shielding portion 621 that covers the peripheral region 202 of the electrochromic structure 2, and a fixing region 622 that extends outwardly from the shielding portion 621. The second adhesive 5 connects the fixing portion 622 of the shielding member 62 to the surrounding wall 12 of the housing 1. The shielding member 62 is reflective and opaque. The shielding member 62 may be made from a material, e.g., ink, aluminum, chromium, nickel, or mercury. The shielding member 62 is ring-shaped. Therefore, the lower and upper side parts 252, 222 are covered by the shielding member 62, and the central region 201 of the electrochromic structure 2 is exposed from the shielding member 62.

The protecting plate 61 is made of glass or plastics. The protecting plate 61 has a thickness ranging from 0.3 mm to 3 mm. When the thickness is less than 0.3 mm, the structural strength of the protecting plate 61 becomes inferior. When the thickness is greater than 3 mm, the light transmittance of the protecting plate 61 would be adversely affected.

The optical adhesive 7 is disposed between the upper substrate 21 of the electrochromic structure 2 and the cover 6, so as to connect the protecting plate 61 of the cover 6 to the electrochromic structure 2. The optical adhesive 7, such as an optical clear adhesive or an optical clear resin, has great light transmittance, so that light emitted from the electrochromic structure 2 would not be shielded.

When applying a predetermined electrical voltage to the upper and lower electrodes 22, 25 through the contacts 27, the ions move through the electrolyte layer 233 from the ion storage layer 232 to the active layer 231, to cause an electrochemical redox reaction in the active layer 231 so as to change the color of the electrochromic structure 2.

Figure 4:
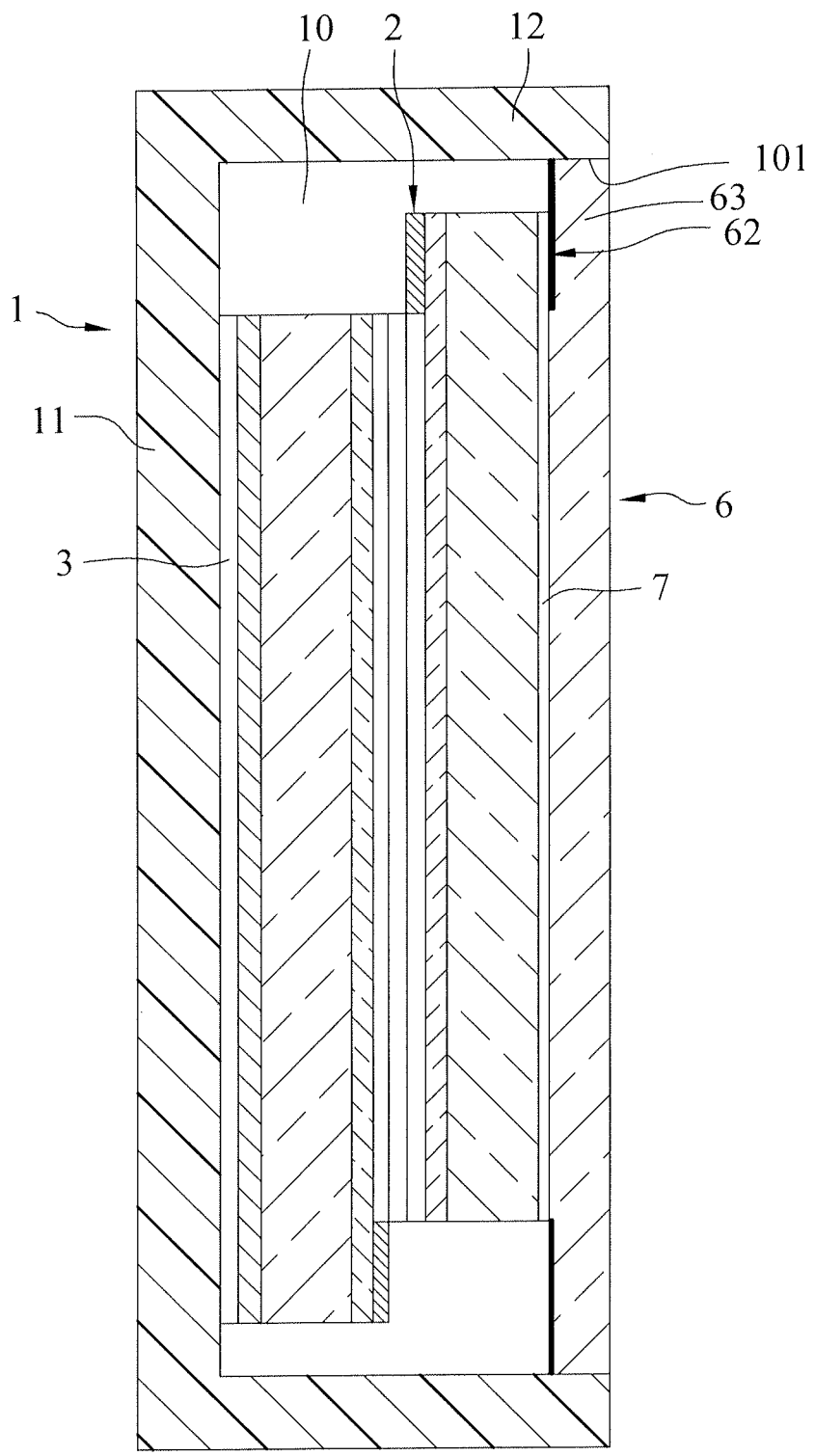
FIG. 4 is a cross-sectional view illustrating a second embodiment of an electrochromic device according to the disclosure.

Referring to FIG. 4, the second embodiment has a structure similar to that of the first embodiment except that the cover 6 has a periphery 63 that is in contact with an inner surface of the surrounding wall 12 to seal the opening 101. Specifically, a periphery of the protecting plate 61 and a periphery of the shielding member 62 connect to the inner surface of the surrounding wall 12 through an adhesive (not shown).

In summary, with the shielding member 62 covering the peripheral region 202 of the electrochromic device of the present disclosure, the drawback associated with the prior art can be eliminated.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrochromic device, comprising:
    a housing defining a receiving space therein and having an opening,
    an electrochromic structure disposed in said receiving space, having a central region and a peripheral region extending outwardly from said central region, and including
        a light-transmissive upper substrate,
        a lower substrate,
        a light-transmissive upper electrode formed on said upper substrate,
        a lower electrode formed on said lower substrate, and
        an electrochromic laminate sandwiched between said upper electrode and said lower electrode; and
    a cover including a light-transmissive protecting plate that has a surrounding portion and that covers said opening of said housing so as to completely cover said electrochromic structure, and a shielding member that is disposed between said peripheral region of said electrochromic structure and said protecting plate and that covers said peripheral region of said electrochromic structure, said shielding member being directly formed on said surrounding portion of said protecting plate.

2. The electrochromic device of claim 1, wherein said upper substrate includes an upper main region and an upper side region that extends from said upper main region in a first direction, said lower substrate including a lower main region and a lower side region that extends from said lower main region in a second direction which is opposite to the first direction, said upper electrode including an upper main part that is formed on said upper main region and an upper side part that extends from said upper main part and that is formed on said upper side region, said lower electrode including a lower main part that is formed on said lower main region and a lower side part that extends from said lower main part and that is formed on said lower side region, said upper and lower side regions and said upper and lower side parts defining said peripheral region of said electrochromic structure and being covered by said shielding member of said cover.

3. The electrochromic device of claim 1, wherein said electrochromic structure further includes two contacts that are respectively disposed on said upper and lower side parts.

4. The electrochromic device of claim 1, further comprising an optical adhesive that is disposed between said upper substrate of said electrochromic structure and said cover, so as to connect said protecting plate of said cover to said electrochromic structure.

5. The electrochromic device of claim 1, wherein said housing further includes a bottom plate and a surrounding wall that extends from a periphery of said bottom plate toward said cover and that cooperates with said bottom plate to define said receiving space.

6. The electrochromic device of claim 5, wherein said cover covers said surrounding wall to seal said opening.

7. The electrochromic device of claim 5, wherein said cover has a periphery that is in contact with an inner surface of said surrounding wall to seal said opening.

8. The electrochromic device of claim 1, further comprising a first adhesive that connects said electrochromic structure to said housing.

9. The electrochromic device of claim 8, wherein said shielding member has a shielding portion that covers said peripheral region of said electrochromic structure, and a fixing portion extending outwardly from said shielding portion, said electrochromic device further comprising a second adhesive that connects said fixing portion of said shielding member to said housing.

10. The electrochromic device of claim 1, wherein said protecting plate is made of glass or plastics.

11. The electrochromic device of claim 1, wherein said protecting plate has a thickness ranging from 0.3 mm to 3 mm.

12. The electrochromic device of claim 1, wherein said electrochromic laminate includes
    an active layer made of an electrochromic material, and disposed beneath said upper electrode,
    an ion storage layer disposed on said lower electrode, and
    an electrolyte layer sandwiched between said active layer and said ion storage layer.

* * * * *